United States Patent [19]

Coucher

[11] 4,032,744

[45] June 28, 1977

[54] GAS STABILIZED PLASMA GUN

[75] Inventor: Robert G. Coucher, Salt Lake City, Utah

[73] Assignee: EPPCO, Salt Lake City, Utah

[22] Filed: Nov. 20, 1974

[21] Appl. No.: 525,341

Related U.S. Application Data

[63] Continuation-in-part of Ser. No. 337,005, March 1, 1973, Pat. No. 3,851,140.

[52] U.S. Cl. .............................. 219/121 P; 219/74; 313/231.1

[51] Int. Cl.² .............................. B23K 9/00

[58] Field of Search ............. 219/121 P, 75, 74, 76; 313/231, 1

[56] References Cited

UNITED STATES PATENTS

| | | | |
|---|---|---|---|
| 3,171,010 | 2/1965 | Potter | 219/75 |
| 3,614,376 | 10/1971 | Manabe et al. | 219/121 P |
| 3,684,911 | 8/1972 | Derugini et al. | 313/231 |
| 3,823,302 | 7/1974 | Muehlberger | 219/121 P |

*Primary Examiner*—J. V. Truhe

*Assistant Examiner*—N. D. Herkamp

*Attorney, Agent, or Firm*—Trask & Britt

[57] ABSTRACT

A method and means for more efficiently stabilizing a plasma arc produced within a plasma producing device. Improved arc stabilization is achieved by dissipating the heat generated by the electrodes of the plasma producing device under controlled conditions. This is achieved, in one instance, by direct liquid cooling of the anode and concomitantly therewith indirect liquid cooling of the cathode. The latter is achieved by passage of a liquid coolant around a heat sink positioned in conductive relationship with the cathode. To further insure controlled heat dissipation and thereby maintain a preselected cathode temperature profile, the plasma forming gas, as well as the liquid coolant, are introduced into the plasma producing device in a manner and at a rate such that the tip of the cathode is maintained at a temperature just below the cathode's melting temperature, the central section of the cathode is maintained at or near the cathode's oxidation temperature and the rear or base section of the cathode is maintained at a temperature below the cathode's oxidation temperature.

4 Claims, 5 Drawing Figures

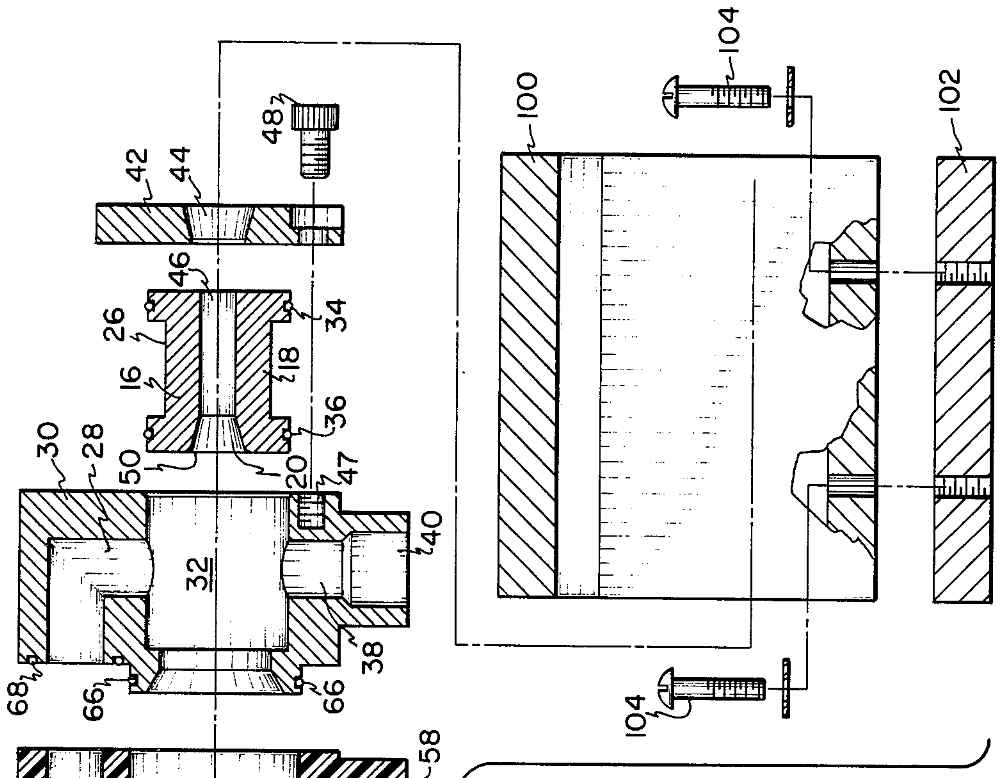
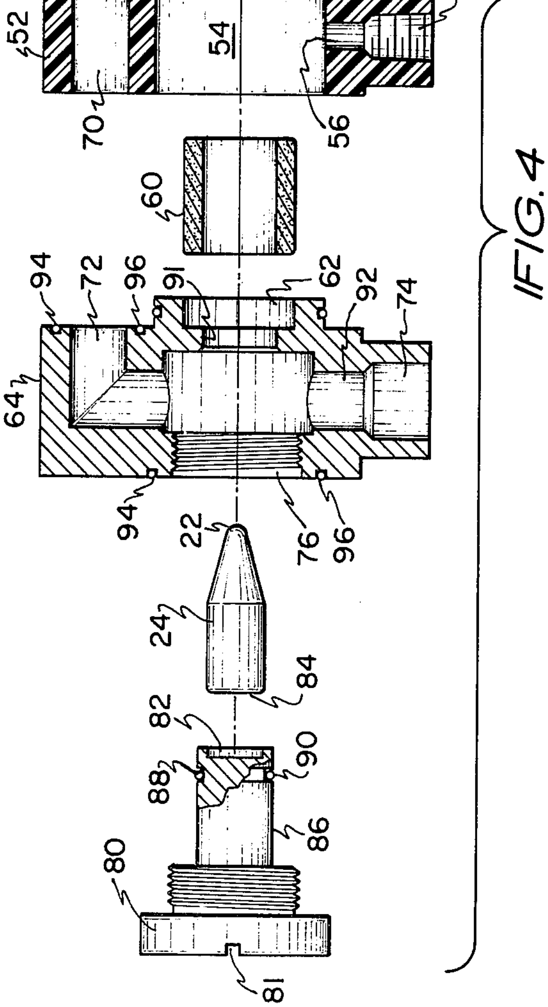
IFIG.4
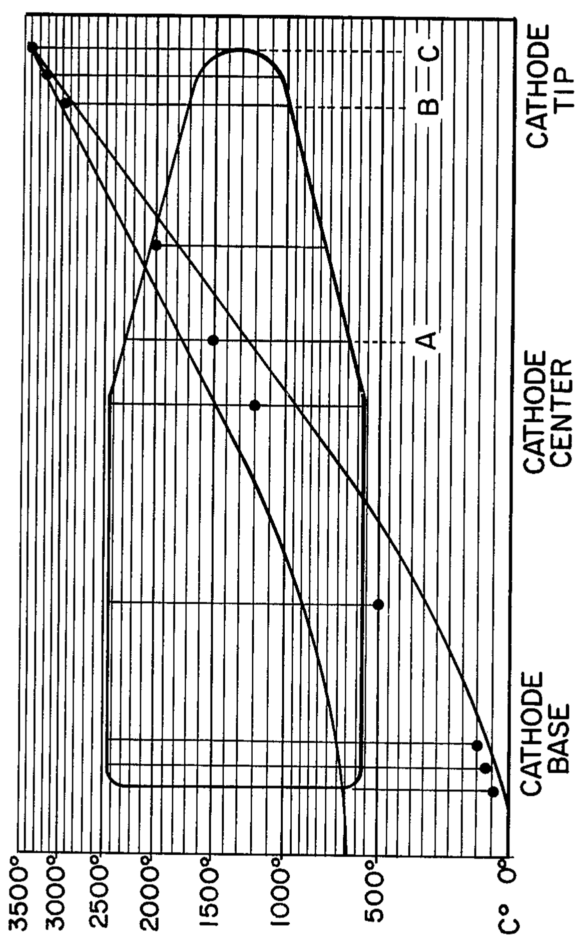
IFIG.5

GAS STABILIZED PLASMA GUN

RELATED APPLICATIONS

This application is a continuation-in-part of patent application Ser. No. 337,005 filed on Mar. 1, 1973 now U.S. Pat. No. 3,851,140 entitled PLASMA SPRAY GUN AND METHOD FOR APPLYING COATINGS ON A SUBSTRATE.

BACKGROUND OF THE INVENTION

1. Field

This invention is directed to plasma producing devices and particularly to an improved means and method for producing a stabilized plasma arc within a plasma producing device.

2. State of the Art

The use of plasma guns for converting a gaseous medium into a plasma having a high temperature and velocity by means of an electrical arc is well known. Although there are a substantial number of patents related to plasma producing devices and particularly plasma spray torches, most of the torches currently available are extremely sensitive and difficult to control, particularly from the aspect of producing a stabilized plasma arc. When a non-stablized plasma arc is being produced, the electrodes become pitted within a very short period of time, necessitiating that the electrodes be replaced on a more frequent basis in order to maintain high operating efficiencies.

OBJECTS OF THE INVENTION

To overcome the above deficiencies, it is a primary object of this invention to provide a plasma spray gun and method for dissipating the heat generated by the cathode within a preselected temperature profile. Another object of this invention is to provide a plasma producing device whereby the anode is directly cooled and the cathode is indirectly cooled by the passage of a coolant around a heat sink in conductive relationship with the base of the cathode. A further object of this invention is to provide a plasma spray gun whereby the flow of liquid coolant and plasma producing gas is coordinated during operation to insure that a preselected cathode temperature profile is maintained. Other objects and advantages of this invention will be more apparent from the description which follows.

SUMMARY OF THE INVENTION

The plasma producing device of this invention comprises generally a plasma producing gun having a cathode and an anode section separated by a dielectric section, said sections defining in unison a substantially enclosed inner or gas chamber. A bored anode is carried within the anode section to define a substantially elongated nozzle outlet from the enclosed inner chamber. A cathode, carried by the cathode section, extends into the enclosed inner or gas chamber in a spaced relationship with the anode. A liquid coolant passageway passes through the anode section circumscribing the anode and thence passing to outlet through connecting passageways bored in the cathode and dielectric sections. A gas distribution ring is supported within the enclosed inner chamber by the dielectric section. The gas distribution ring circumscribes the cathode and thereby permits a plasma producing gas to flow about the cathode and into the inner or gas chamber. An electrical energy source is provided to produce an electrical arc between the cathode and the anode for converting the gas introduced into the inner or gas chamber into a high temperature, high velocity plasma. The electrical palsma producing arc is stabilized by cooling the anode and maintaining the cathode at a temperature such that a temperataure profile substantially identical to that depicted in FIG. 5 is produced. The above cathode temperature profile is achieved by passing a liquid coolant through interconnecting liquid coolant passageways such that the anode is directly cooled by the liquid coolant and the cathode is indirectly cooled by passage of the liquid coolant around a heat sink, which is in conductive relationship with the cathode.

BRIEF DESCRIPTION OF THE DRAWINGS

FIG. 4 is an exploded side cross sectional view of the gun shown in FIG. 1;

FIG. 5 is a chart which graphically and pictorially depicts a temperature profile generated by the cathode during operation of the plasma gun shown in FIG. 1.

DESCRIPTION OF THE PREFERRED EMBODIMENT

The plasma gun of this invention comprises in combination three primary or major sections — the cathode section 10, the anode section 14 and an intermediate or dielectric section 12. All three sections are described in detail in the description which follows.

ANODE SECTION

Figure 3:
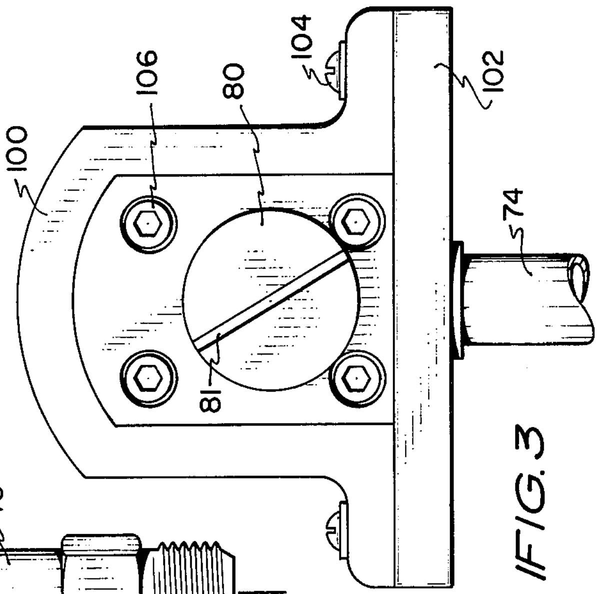
FIG. 3 is a back elevation of the plasma gun shown in FIG. 1 looking from left to right.
Figure 2:
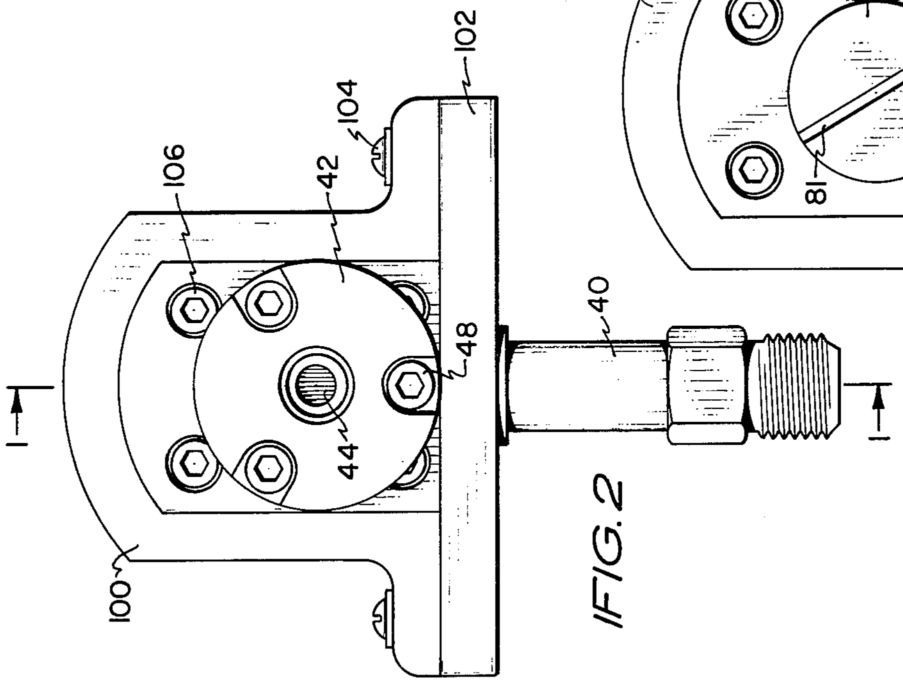
FIG. 2 is a front elevation of the plasma gun shown in FIG. 1 looking from right to left.
Figure 1:
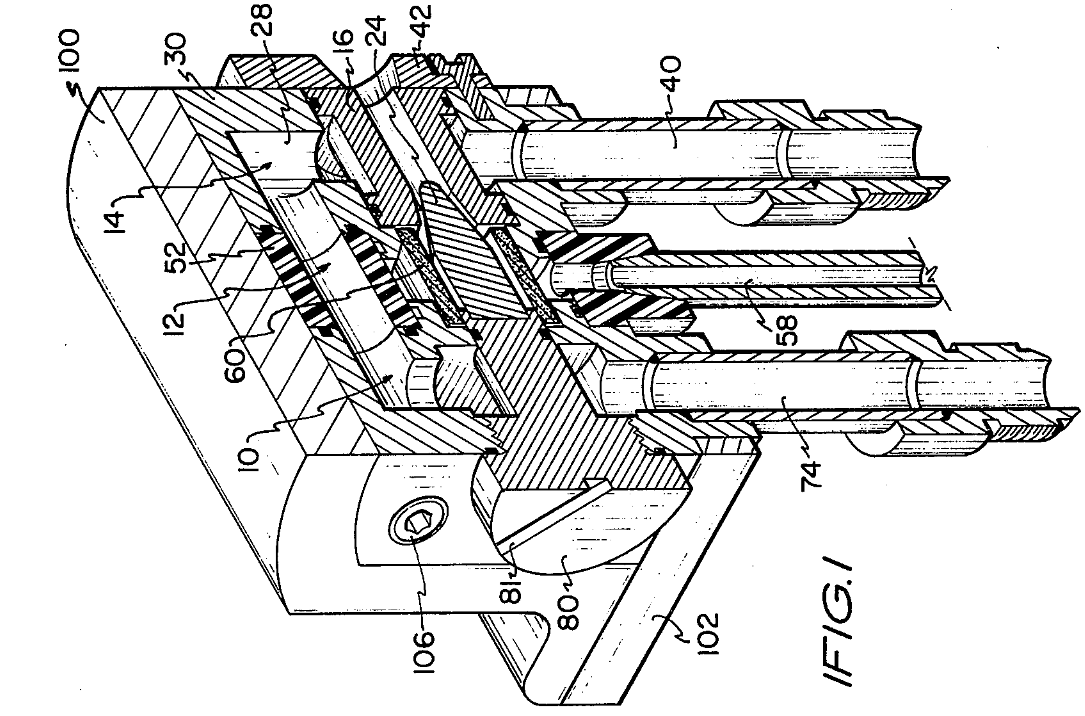
FIG. 1 is a three dimensional cut-a-way view of the plasma gun of this invention taken along line 1—1 of FIG. 2.

The anode section 14 includes a copper anode nozzle 16 comprising a substantially cylindrical centrally bored copper piece 18. The inlet end 20 of the nozzle is expanded or conically shaped to accommodate in spaced relationship the tip 22 or forward end of a tungsten, or preferably, a tungsten thoriated cathode 24. The anode has a wide, deep set annular groove 26 along its outer peripheral surface. This annular groove is in communication with a liquid coolant passageway 28 vertically bored in a brass anode holder 30. The anode holder 30 has a bored center section 32 which over-rides the inserted copper anode 16, (see FIG. 1). To insure a sealing environment between the nozzle anode 16 and anode holder 30, the anode is adapted with a small annular groove 34 cut into each end of the anode for receiving an "O" ring 36. The inlet end 38 of the liquid coolant passageway 28 of the anode holder 30 is adapted to receive a liquid coolant line and an electrical line 40 which provides the gun with the coolant and electrical power necessary for operation of the gun. The front face of the copper nozzle 16 and anode holder 30 is fitted with a brass cover plate 42 having a flared central opening 44 in alignment with the central bored opening 46 of the anode nozzle 16. The cover plate 42 can take on most any configuration and is normally used to hold the anode in position and as an adapter for the addition of auxiliary equipment, such as a powder feed inlet line and connector for introducing particulated materials into the exiting plasma gas. Particulated materials such as metals and polymeric materials can thereby be introduced into the plasma stream for eventual deposition on a substrate. Other adapting pieces may also be used with this plasma gun. The brass cover plate is secured to the anode holder by means of a threaded opening 47 bored therein and a bolt 48.

As will hereinafter be explained in greater detail, the leading edge 50 of the anode, that is, that forward portion leading from the gun's inner chamber which is also the gun's gas receiving chamber, is rounded or curved to minimize, if not avoid, a turbulent gas flow. For the embodiment shown in FIGS. 1–4 the leading edge of the nozzle is rounded to about 1/16 to 1/64 of an inch (0.16 to 0.04 cm) and preferably is rounded to about 1/32 of an inch (0.08 cm.).

DIELECTRIC SECTION

Abutting the rear face of the anode section 14 is the dielectric section 12 of the plasma spray gun. The dielectric section comprises a gas ring holder 52 having a central or axial bore 54 registering and in communication with the central bore 46 of the nozzle anode 16. The gas ring holder 52 is constructed from a dielectric material such as Nylon, impregnated with titanium oxide or phenolic resins, such as Bakelite. Any material which is nonelectrical or nonconductive and capable of withstanding high temperatures may be used. In addition to the central bore, the gas ring holder 52 contains a radial bore 56 which is in communication with the central longitudinal or axial bore 54. The radial bore is adpated to receive an inlet plasma producing gas feed line 58 which in turn is connected to a gas source (not shown).

A ceramic gas distribution ring 60 is held within the central bore 54 of the gas ring holder 52 by a reduced bore 62 located in the forward end of the cathode holder 64. The gas distribution ring distributes the plasma producing gas carried by the inlet line 58 and radial bore 56 of the gas ring holder into the gun's inner or gas receiving chamber. The gas distribution ring 60 is preferably designed with radial and axial bores (not shown) to distribute the gas in a manner such that a major portion of the plasma producing gas is introduced into the gas receiving chamber as a linear flow, and a minor portion of the gas is introduced as a helical flow component which circumscribes the linear flow component. The gas distribution ring used herein is described in greater detail in U.S. patent application Ser. No. 337,005 filed on Mar. 1, 1973.

To insure a tight fit between the anode section 14 and the dielectric section 12, a plurality of small anular grooves 66 are provided along the rear section of the anode holder 30 for receiving "O" rings 68. Although "O" rings are depicted as the sealing means between the various sections of the plasma spray gun, any sealing means capable of withstanding high temperatures may be used. Preferably, though, the sealing means will not be of a permanent nature, so as to permit convenient disassembly of the plasma gun for repairing, cleaning or otherwise modifying the plasma gun as may be desired.

The gas ring holder as earlier indicated contains a central bore 54 whereby a tungsten, or preferably a thoriated tungsten cathode 24, having a conically shaped head, is held in spaced relationship with the anode nozzle 16. The gas distribution ring, as earlier noted, circumscribes the cathode 24 in spaced relationship thereto. The gas entering the gas distribution ring is ejected about the cathode through ports in the gas distribution ring and into the inner or gas receiving chamber as was earlier described.

The dielectric section contains an upper, longitudinally bored coolant passageway 70 aligned with and in communication with the liquid coolant passageway 28 bored in the anode holder 30. The liquid coolant introduced into the anode holder is carried within the annular groove 26 formed in the anode nozzle 18 and outwardly into the liquid coolant passageway 28 of the anode nozzle holder 30 and then into the liquid coolant passageway 70 formed in the gas ring holder 52. From there the liquid coolant passes into the liquid coolant passageway 72 bored in the cathode holder and thence to an outlet line 74 to complete the cooling flow sequence.

CATHODE SECTION

The cathode section 10 comprises a centrally bored brass cathode holder 64 having a rear internally threaded end section 76. A threaded copper base or plug 80 is screwed into the cathode holder, closing off the rear section of the central bore. The rear face of the base plug 80 contains a slot 81 to facilitate its removal from the cathode holder by means of a screwdriver. The forward elongated end 86 of the copper base or plug contains a recessed blind bore 82 for receiving and holding the base 84 of the cathode 24. The cathode 24 can be secured to the cathode base or plug by most any means capable of providing a convenient means of disassembly. For example, the base of the cathode may be threaded for screwing into a corresponding threaded opening bored in the end of the plug 80.

The cathode base has a machined down elongated forward section 86 which is in the path and in communication with the liquid coolant passageways 72 bored in the cathode holder. The liquid coolant passes through the dielectric section, enters the cathode holder and passes around the elongated forward section of the cathode base, cooling same. Annular grooves 88 and "O" rings 90 are also provided in the forward end of the elongated section 86 for contact with a ridge 91 in the cathode holder 64 to prevent passage of the liquid coolant into the inner or gas receiving chamber. The cathode holder 64 is also provided with a radial bore 92 which communicates with the liquid coolant passageway 72. The radial bore 92 is adapted with an outlet line 74 for carrying the liquid coolant away from the plasma gun. The outlet line 74 is adapted with an electrical conduit for carrying an electric current to the cathode in the same manner the inlet line 40 carries an electrical current to the anode. Additional radial grooves and "O" rings 94 and 96, respectively, are also provided on the forward and rearward face of the cathode holder to maintain a complete seal between the cathode base, the cathode holder and gas ring holder.

All three sections of the plasma gun are enclosed and held in position by an insulated gun housing 100 secured to a base member 102 by overhead screws 104. The gun housing is constructed from a non-conductive material such as rubber, plastic, synthetic resin and the like. The various sections of the gun are held in positional alignment with respect to each other by long-stemmed threaded bolts passing longitudinally through at least two of the gun's main sections.

OPERATION

In operation a radio frequency current is applied to the anode and cathode through their respective electrical connecting conduits carried by the anode and cathode holder, respectively. The initial high voltage produces an electrical arc between the cathode and anode. In addition, the electrical arc provides a conductive path which allows for a lower voltage to be applied to the electrodes and still maintain an arc therebetween. Generally, the electrical arc can be sustained by the application of 50–85 volts and 150–400 amperes across the electrodes. Once the arc has been generated and stabilized, the voltage may then be further reduced to a point where the electrical arc is just being sustained.

A plasma producing gas is introduced into the inner or gas receiving chamber via the gas distribution ring and the gas inlet line. As the gas passes through the electrical arc, the gas is ionized, producing what is normally referred to as a gas plasma. Since the plasma is a highly energized material, it is emitted through the nozzle at a temperature of between about 2,000° to 10,000° C., and at a velocity approaching mach 1.

As indicated, one of the major problems with plasma guns of the type herein described, was the difficulty in maintaining a stabilized electrical arc. For puspose of this disclosure, the electrical arc can be said to be stabilized if it is evenly distributed between the tip of the cathode and the longitudinal base of the anode nozzle. The arc can be said to be unstabilized if it moves from one point to the next along the longitudinal nozzle bore causing pitting of the nozzle's inner wall. When the arc is unstable, the temperature and velocity of the resulting plasma is likewise difficult to control and to maintain constant.

To maximize stabilization of the electric arc and thereby maintain a more consistant plasma, it has been found that if the cathode is cooled so that it has a temperature profile within the range graphically depicted in FIG. 5, the electrical arc and resulting plasma are thereby stabilized. Basically it has been found that if the tip of the cathode is maintained at a temperature of just below the melting point of the material from which the cathode is constructed (eg tungsten), a more stabilized, highly efficient plasma can be produced. It has been further found that if the cemtral portion of the cathode is maintained at a temperature at or near the oxidation temperature of the tungsten cathode and the rear or base end of the cathode is held at a temperature below the oxidation temperature of the cathode, improved arc stabilization can be obtained. When a tungsten cathode is used, the melting point is about 3370° C, the oxidation temperature is about 1200° C and the base of the cathode is maintained at a temperature of around 150° C. When these temperatures are graphically represented on a semi-log graph, an essentially straight line is generated. The lines on either side of the plotted points represent the range of cathode temperatures which may by used for achieving and maintaining arc stabilization. For example, the tip of the cathode should preferably be held at a temperature of around 3000°–3300° C, with the center and base section of the cathodes to be held between a temperature range of between about 800°–1600° C and 100°–700° C, respectively.

If a thoriated-tungsten, rather than a tungsten cathode is used, a more complex temperature profile is generated. With a thoriated-tungsten cathode, the thorium, having a lower melting and boiling point than tungsten, (1845° and 3000° C, respectively), will achieve maximum ion emission at a temperature substantially lower than that of tungsten. This range is depicted in FIG. 5, as being approximately between points A and B. Within this range the thorium exhibits its highest ion emission potential.

The range between points B and C represent the range wherein maximum ion emission from the tungsten portion of the cathode is achieved. Since that section of the cathode between points B and C contain little, if any thorium, (most of it being boiled off), the thoriated tungsten cathode provides a broader base from which ions can be released.

Whether the cathode is constructed from a single pure metal or whether it is constructed from a mixture of metals, the basis premise hereinbefore set forth is applicable. In other words, the cathode should possess a temperature profile such as that depicted in FIG. 5 for each metal present.

To achieve this type of temperature profile, it has been found that the means used for cooling the anode and cathode, as well as the rate of palsma producing gas flow, must be coordinated with the voltage and amperage applied to the electrodes. For purposes of this invention it is assumed that the applied voltage and current is held relatively constant, leaving the means for cooling the electrodes and the gas flow introduced into the plasma gun as the controlling variables.

Of the two variables, the means for cooling the cathode and anode have been found to be the most critical. The most effective cooling was achieved by cooling the anode directly and by cooling the cathode indirectly with the liquid coolant. To achieve the latter, the cathode base is constructed from a highly heat conductive heat transferring material such as copper. The heat generated by the cathode is transferred to the cathode base through conduction, and the cathode base is thereafter subsequently liquid cooled with the liquid coolant passing around the anode and through the anode holder and dielectric section into the cathode section of the plasma gun. With this system the base of the cathode is more rapidly cooled than its tip, permitting the tip to be more easily maintained at a much higher temperature than the base of the cathode. With this arrangement the cathode base functions as a heat sink for the cathode.

In addition, a high temperature differential is maintained between the anode and the tip of the cathode. In most cases the anode is held at a temperature of below 500° C and preferably between about 200°–500° C. It has also been found that the rate of gas flow into the gas chamber also assists in producing the desired cathode temperature profile, as well as maintaining the desired temperature differential between the cathode tip and the anode.

This gas flow will vary depending on the type of gas introduced into the plasma producing chamber. If the plasma producing gas is diatomic, e.g., nitrogen, the gas flow will be between 40 and 150 cubic feet ($113.2 \times 10^4$ to $424.5 \times 10^4 cm^3$) per hour, and more preferably between 50 to 80 cubic feet ($141.5 \times 10^4$ to $226.4 \times 10^4 cm^3$) per hour, after the desired flow of plasma producing gas is achieved and if the cathode temperature, that is, the temperature which will provide a temperature profile such as that shown in FIG. 5, has not been attained, the rate of water coolant flow is increased or decreased, to obtain the desired temperature profile.

When the plasma producing gas is nitrogen, the rate of coolant flow will normally be between about 3 and 5 gallons per minute (13.7 and 22.8 liters) assuming that a voltage of between about 50 and 70 volts having a current flow of between about 150 and 300 amperes is applied to the cathode. When the above operating parameters are applied to the plasma gun hereinbefore described, the cathode will assume the temperature profile depicted in FIG. 5.

While the invention has been described with reference to several specific embodiments, it should be understood that certain changes in construction may be made by one skilled in the art and would not thereby depart from the spirit and scope of this invention which is limited only by the claims appended hereto.

I claim:

1. A method for stabilizing a plasma producing arc produced by a plasma producing device having a spaced apart cathode and anode and a means for producing a plasma producing arc between said cathode and anode, comprising cooling said cathode in a manner such that a cathode temperature profile substantially identical to that which is depicted in FIG. 5 is obtained.

2. A method for stabilizing a plasma producing arc produced by a plasma producing device having a spaced apart cathode and anode and means for producing a plasma producing arc between said cathode and anode, comprising cooling said cathode in a manner such that the tip of the cathode is just below its melting temperature, the mid or center section of the cathode is at or near its oxidation temperature and the base of the cathode is below its oxidation temperature.

3. A method according to claim 2, wherein plasma-producing gas is introduced between said cathode and anode at a selected rate; liquid coolant is introduced to directly cool said anode and indirecly cool said cathode; and said selected rate of gas introduction and the cooling rates of said cathode and anode are coordinated such that the temperature of the tip of the cathode is held at a temperature between about 300° C and about 3300° C, the temperature of the center section of the cathode is held between about 800° C and about 1600° C, and the temperature of the base section of the cathode is held between about 100° and about 700° C.

4. A method for cooling a cathode in a plasma producing device having a gas distribution ring circumscribing said cathode for introducing a plasma producing gas into said plasma producing device whereby a major portion of said plasma producing gas is introduced as a linear flow component and a minor portion is introduced as a helical flow component circumscribing said linear flow component, comprising introducing a liquid coolant into said plasma producing device to cool said cathode in a manner such that the tip of said cathode is just below its melting temperature, the mid or center section of said cathode is at or near its oxidation temperature and the base of the cathode is below its oxidation temperature.

* * * * *

UNITED STATES PATENT OFFICE
CERTIFICATE OF CORRECTION

Patent No. 4,032,744 Dated June 28, 1977

Inventor(s) Robert G. Coucher

It is certified that error appears in the above-identified patent and that said Letters Patent are hereby corrected as shown below:

Column 2, line 4, change "palsma" to ---plasma---;

Column 4, line 4, insert ---liquid--- between the words "bored" and "coolant";

Column 5, line 46, change "cemtral" to ---central---;

Column 8, line 12, change "300°C" to ---3000°C---.

Signed and Sealed this

*Twenty-second* Day of *November 1977*

[SEAL]

*Attest:*

RUTH C. MASON
*Attesting Officer*

LUTRELLE F. PARKER
*Acting Commissioner of Patents and Trademarks*